United States Patent
Ito et al.

[11] Patent Number: 5,884,120
[45] Date of Patent: Mar. 16, 1999

[54] IMAGE FORMING APPARATUS FOR FORMING MULTIPLE IMAGES ON A SINGLE SHEET

[75] Inventors: Hiroyasu Ito, Okazaki; Tomokazu Kato; Eiichi Yoshida, both of Toyokawa, all of Japan

[73] Assignee: Minolta Co., Ltd., Osaka, Japan

[21] Appl. No.: 747,128

[22] Filed: Nov. 12, 1996

[30] Foreign Application Priority Data

Nov. 13, 1995 [JP] Japan ................................ 7-294557

[51] Int. Cl.[6] ........................... G03G 15/00; G03G 15/01
[52] U.S. Cl. ............................... 399/54; 397/85; 358/501
[58] Field of Search .................................. 358/299, 501; 397/9, 54, 82, 85; 382/165

[56] References Cited

U.S. PATENT DOCUMENTS

| | | | |
|---|---|---|---|
| 4,847,654 | 7/1989 | Honma et al. ......................... | 358/300 |
| 5,032,904 | 7/1991 | Murai et al. ........................... | 358/500 |
| 5,475,475 | 12/1995 | Kohtani et al. ........................ | 399/79 |
| 5,539,445 | 7/1996 | Muramatsu et al. ................... | 347/262 |

FOREIGN PATENT DOCUMENTS

| | | |
|---|---|---|
| 3-64773 | 3/1991 | Japan . |
| 4-282968 | 10/1992 | Japan . |
| 4-320163 | 11/1992 | Japan . |

*Primary Examiner*—Joan Pendegrass
*Attorney, Agent, or Firm*—McDermott, Will & Emery

[57] ABSTRACT

An image forming apparatus has N-in-1 mode for forming an image of N documents in a sheet of paper and automatic color selection mode for deciding whether a document is a color document or a monochromatic one. When the N-in-1 mode and the automatic color selection mode are selected, color copy mode is selected if a number of color documents in N documents to be reproduced in a sheet of paper is larger than a predetermined reference value.

13 Claims, 18 Drawing Sheets

Fig. 8
<4in1 Output image>　　　　　<Output mode>
| 4in1 Image | Count | | Color change number | |
|---|---|---|---|---|
| | | | =4 | =1 |
| Mono / Mono / Mono / Mono | Color: 0, Mono: 4 |  | Mono | Mono |
| Color / Mono / Mono / Mono | Color: 1, Mono: 3 |  | Mono | Color |
| Color / Mono / Mono / Color | Color: 2, Mono: 2 |  | Mono | Color |
| Color / Color / Mono / Color | Color: 3, Mono: 1 |  | Mono | Color |
| Color / Color / Color / Color | Color: 4, Mono: 0 |  | Color | Color |
Color/Mono change pattern

IMAGE FORMING APPARATUS FOR FORMING MULTIPLE IMAGES ON A SINGLE SHEET

BACKGROUND OF THE INVENTION

1. Field of the Invention

The present invention relates to an image forming apparatus having a function to print a plurality of documents in a sheet of paper.

2. Description of the Prior Art

An electrophotographic copying machine has various modes. For example, automatic color selection mode may be provided to decide a color document or a monochromatic document. If a document to be copied is decided to be a color document, a color copy is printed, while if the document is decided to be a monochromatic document, a monochromatic copy is printed.

On the other hand, there is also known a mode to print a plurality of documents in a sheet of paper. This mode is referred to as N-in-1 mode where N documents are printed in a sheet of paper. For example, N =2 or 4. However, N documents to be copied in a sheet of paper may include both color and monochromatic documents. Then, N-in-1 mode may not be combined with the automatic selection mode.

A user may want a color print if the N documents include at least one color document. On the other hand, another user may want a color print only if all the N documents are color documents, in order to decrease copy costs because color copy is expensive. Then, when N-in-1 mode is used, a user has to select color copy or monochromatic copy for each N documents. Therefore, copy operation takes a longer time and labor in N-in-1 mode.

SUMMARY OF THE INVENTION

An object of the present invention is to provide an image forming apparatus wherein automatic color selection is performed in N-in-1 mode.

An image forming apparatus according to the invention has a mode for forming an image of a plurality of documents in a sheet of paper. The apparatus has an image reader for reading an image of a document, and a print device is for forming a color image or a monochromatic image on a sheet of paper. A detection device obtains information on color on a plurality of documents to be reproduced in a sheet of paper from image data of the plurality of documents. A controller controls the print device to change image-forming conditions thereof of an image of the plurality of documents to be reproduced in a sheet of paper according to the information on color. For example, the detection device detects for each document whether the document is a color document or a monochromatic document, and the controller controls the print device to form a color image when a ratio of color documents the plurality of documents is larger than a predetermined value. Alternatively, the information on color may be obtained not on each document, but on the whole documents. The information on color is obtained, for example, in a prescan performed before a scan for forming an image on a transfer material.

An advantage of the invention is that a user can operate a copying machine easily because one of color copy mode and monochromatic copy mode is selected automatically when color documents are included in documents to be reproduced in a sheet of paper.

Another advantage of the invention is that the automatic selection is performed simply by detecting a ratio of color documents in documents to be reproduced in a sheet of paper.

BRIEF DESCRIPTION OF THE DRAWINGS

These and other objects and features of the present invention will become clear from the following description taken in conjunction with the preferred embodiments thereof with reference to the accompanying drawings, and in which:

FIG. 8 is a diagram for explaining output patterns of color copy and monochromatic copy in 4-in-1 mode;

DETAILED DESCRIPTION OF THE PREFERRED EMBODIMENTS

Figure 1:
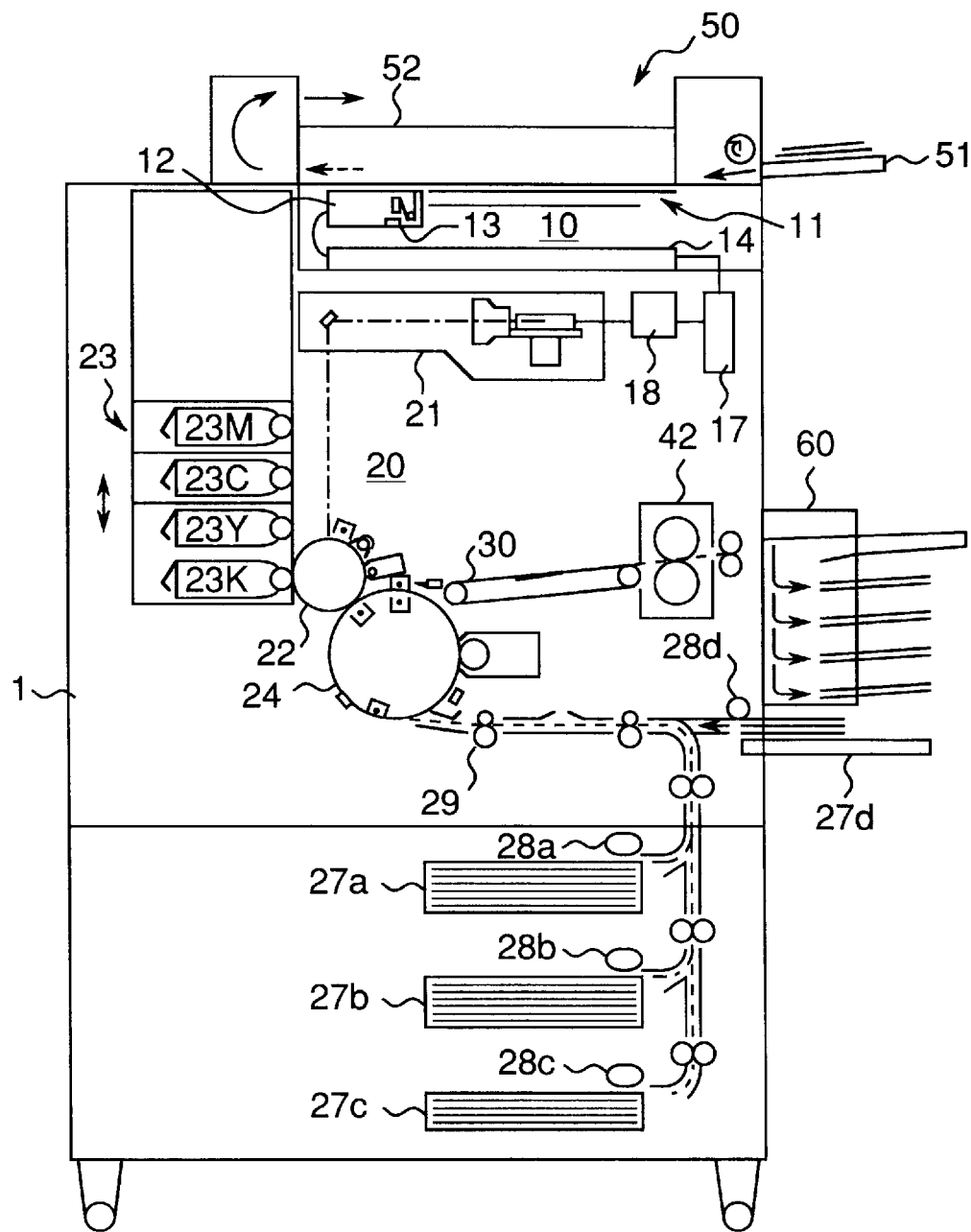
FIG. 1 is a schematic sectional view of a digital color copying machine.

Referring now to the drawings, wherein like reference characters designate like or corresponding parts throughout the views, FIG. 1 shows a digital color copying machine of an embodiment of the invention. The color copying machine comprises a main body 1, an automatic document feeder 50 and a sorter 60. In the automatic document feeder 50, documents are set on a document tray 51, and they are sent one by one onto a platen glass 11 of the main body 1. Then, the document is read by an image reader 10. Then, the automatic document feeder 50 discharges the document to a tray 52.

The main body 1 comprises the image reader 10 and a printer 20. In the image reader 10, a document feed by the automatic document feeder 50 is scanned by a scanner 12, and the document image is converted by a color image sensor (charge coupled device) 13 to electric signals. An image data processing unit 14 processes the electric signals and sends image signals to a memory unit 17. The memory unit 17 sends the as-received image signals to the printer 20 or stores them in a memory. A print head controller 18 converts the image signals to digital data for driving a laser diode. An operational panel 16 (FIG. 2) is provided at the top of the main body 1 in order to set various modes in the copying machine.

The printer 20 comprises an image-forming section, a developing section and a paper carrying section. In the image-forming section, a print head 21 having the laser diode and a focus optical system modulates a laser beam based on the image signal and forms an electrostatic latent image on a photoconductor drum 22. After the latent image is developed by a developing section 23, and the toner image is transferred onto a sheet of paper on a transfer drum 24.

The developing section 23 comprises developing units 23M, 23C, 23Y and 23K for development with magenta, cyan, yellow and black toners. When color copy mode is selected, as will be explained later, the developing units 23M, 23C, 23Y and 23K are moved successively to a developing position to develop the latent image. Similarly, when monochromatic color is selected, only the developing unit 23K is moved to the developing position to develop the latent image.

The paper carrying section comprises three paper cassettes 27a, 27b and 27c and a manual insertion tray 27d, having paper-feed rollers 28a, 28b, 28c and 28d. The paper carrying section further comprises a timing roller 29, carriage rollers for carrying a sheet of paper supplied from the cassette 27a or the like to a transfer drum 24, the transfer drum 24 holding the sheet of paper image and transferring it to the image forming section, a transfer belt 30 for carrying the sheet of paper after transfer of toner images, and a fixing unit 42 for fixing the toner image on the sheet of paper. Then, the sheet of paper is carried to the sorter 60.

The print unit 20 forms a multi-color image by using a known electrophotographic process, and detailed explanation thereof is omitted here.

Figure 2:
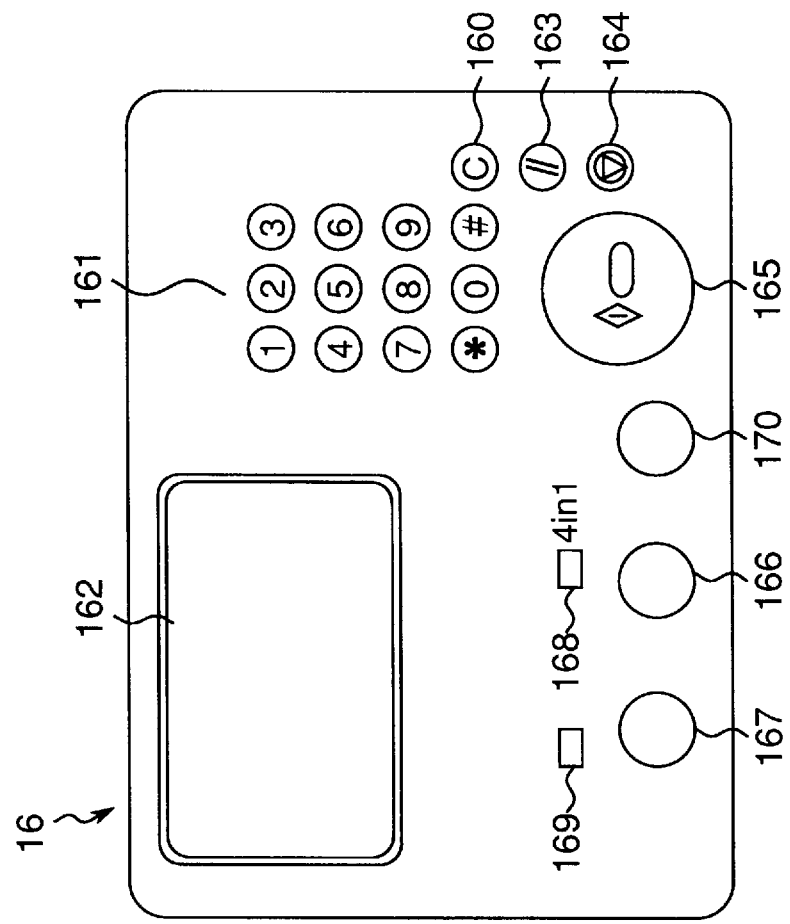
FIG. 2 is a plan view of an operational panel of the digital color copying machine.

FIG. 2 shows the operational panel 16. The operational panel 16 comprises clear key 160, ten-keys 161, a liquid crystal display 162, stop key 163, interrupt key 164, start key 165, 4-in-1 mode key 166, color change number key 167, a light-emitting diode 168 lighted in 4-in-1 mode, and a light-emitting diode 169 lighted when a color change number (reference value) is set to four, and a reference key 170.

In the initialization state after an electric power source of the copying machine is turned on, the light-emitting diodes 168 and 169 for 4-in-1 mode and for color change number are turned off. When the 4-in-1 mode key 166 is pressed, 4-in-1 mode is selected, and the light-emitting diode 168 is turned on. If the color change number key 167 is pushed, the light-emitting diode 169 is turned on, and the color change number of four is selected. If the color change number key 167 is pushed again, the light-emitting diode 169 is turned off, and the color change number of one is selected. Further, When the 4-in-1 mode key 166 is pushed, 4-in-1 mode is selected, and the light-emitting diodes 168 and 169 are turned off. If a user wants to set a reference value other than a default value, he or she presses the reference key 170 and set the reference value with the ten-keys 161.

Figure 3A:
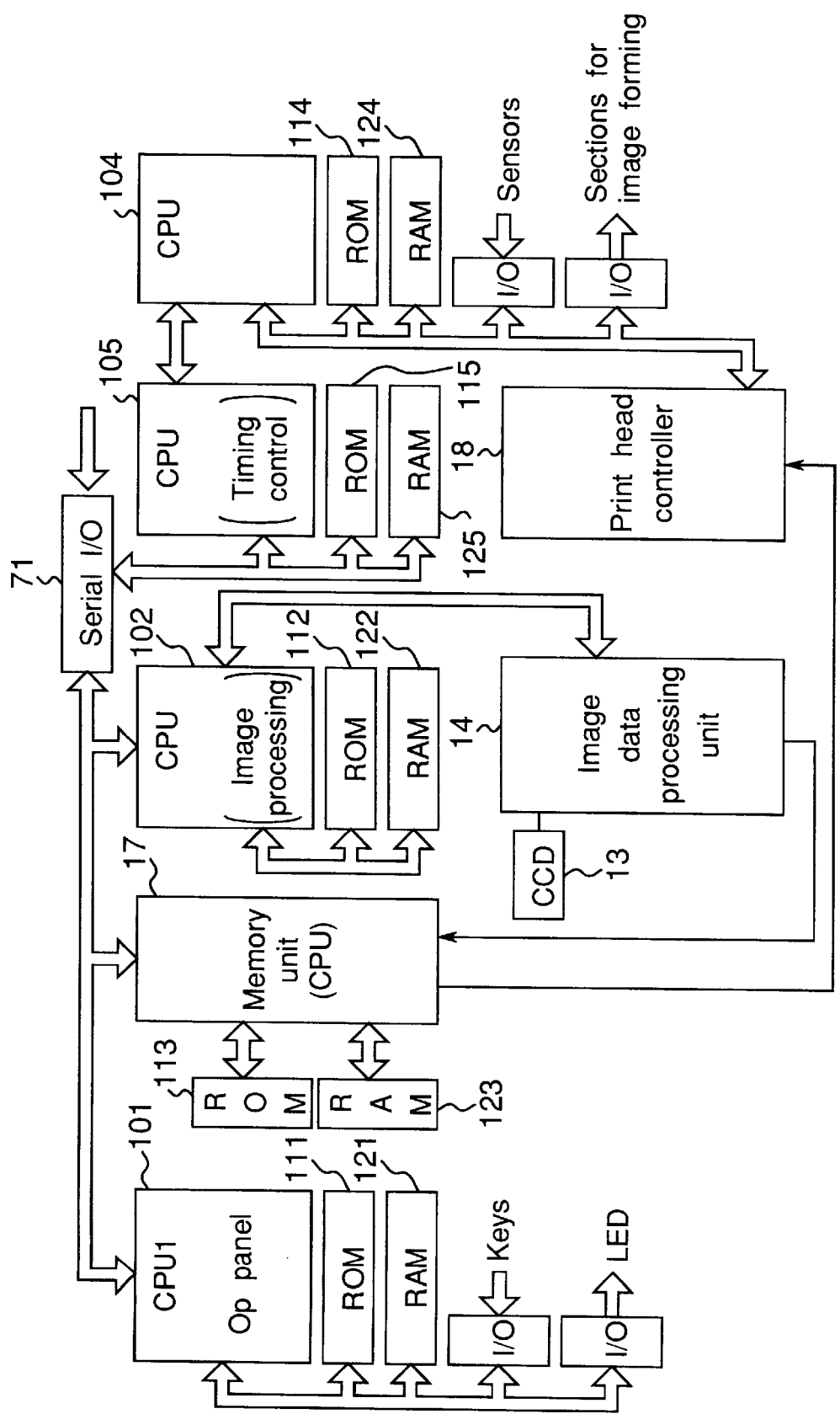
FIGS. 3A and 3B are block diagrams of a controller of the digital color copying machine.
Figure 3B:
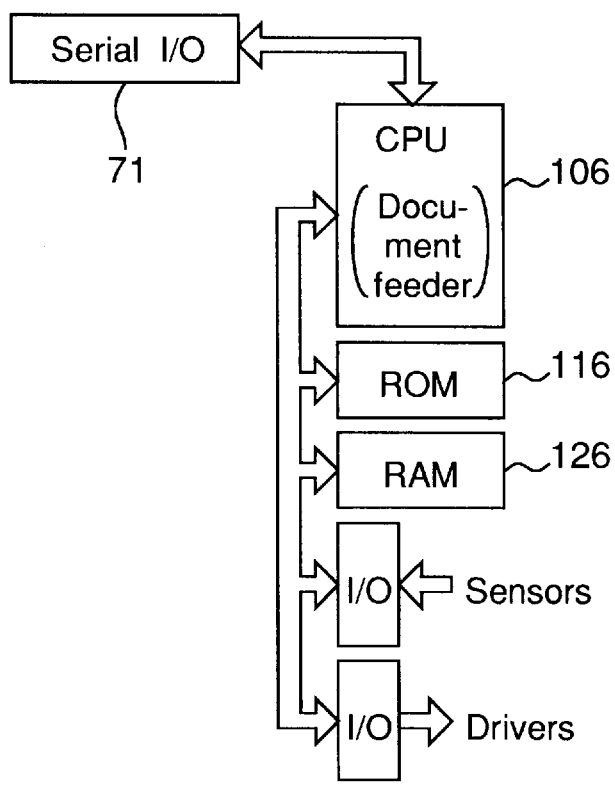

FIGS. 3A and 3B show a controller of the color copying machine. The controller can perform automatic color selection in a prescan on a document put on the platen glass 11 in order to decide copy mode automatically or to decide whether the document is a color document or a monochromatic one. If the document is a monochromatic document, only the developing unit 23K of black toners is used, and copy speed is increased.

The controller comprises six central processing units 101–106, each connected to a read only memory (ROM) 111–116 for storing programs and a random access memory (RAM) 121–126 used as a work area.

The central processing unit 101 controls the operational panel 16.

The central processing unit 102 controls the image reader 10. As shown in FIG. 3, the central processing unit 102 receives a signal on the position of the scanner 12 from a position sensor 80. Then, it controls the image data processing unit 14 and drives the image reader 10 including the motor 85 for driving the scanner 12, in response to the position signal. The image data processing unit 14 comprises an analog-to-digital converter 82 for converting analog signals of the color image sensor 13 to digital signals, an image processor 83 processing the digital signals and supplying image data, and an image monitor memory 84 for storing image data received from the image processor 84, and a timing controller 81 for supplying image control signals to the above-mentioned components.

The central processing unit 103 is included in the memory unit 17 and processes image data received from the image data processing unit 83 to generate print data. The print data are sent to the print head controller 18.

The central processing unit 104 controls the print head controller 18 and the optical system, the image-forming system and the paper carrying system in the main body 1.

The central processing unit 105 controls the timings for operating the entire controller and sets operation modes of the copying machine.

The central processing unit 106 (FIG. 3B) controls the automatic document feeder 50, and it is connected through a serial input/output device 71 to the central processing units 101, 102, 103 and 105. The central processing unit 106 instructs feed, carriage, discharge or the like of documents. The central processing unit 105 produces a document management table (FIG. 7) according to this information as will be explained later.

In the above-mentioned color copying machine, usually, an image of one document is read, and print data is generated by correcting the image data appropriately. Then, the print data is output by the optical system to form an image on a sheet of paper. Further, when 4-in-1 mode is selected, four document images reduced to ¼ when each document is read are output on a face of a sheet of paper.

Figure 5:
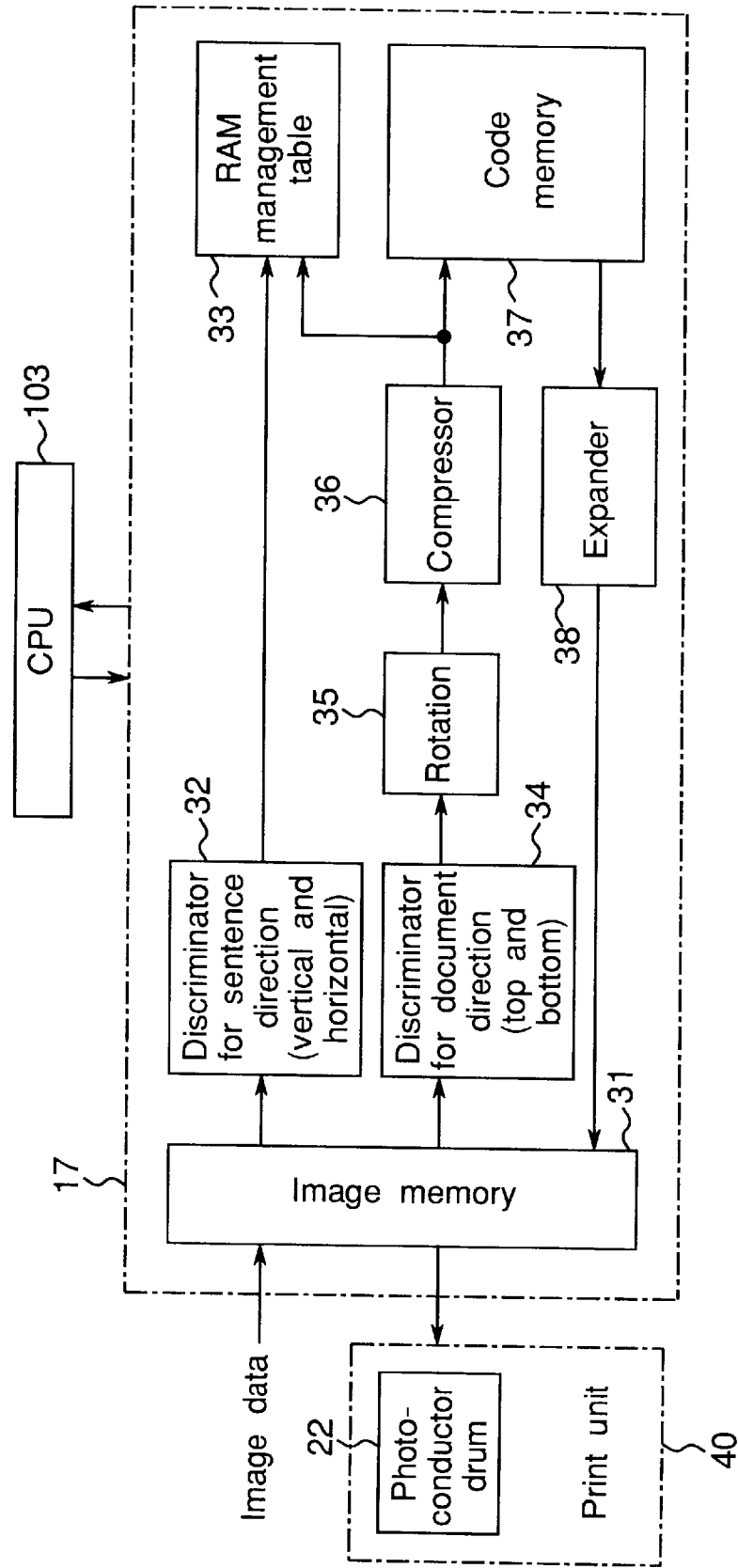
FIG. 5 is a block diagram of a controller for controlling an image data processing unit.

The image data is processed by the memory unit 17. FIG. 5 shows the memory unit 17 controlled by the central processing unit 103. In the memory unit 17, the image data of a page transferred from the image data processing unit 14 are written to the image memory 31. Then, a discriminator 34 discriminates the document direction (top and bottom) based on the image data. Then, the image data is rotated by a rotation processor 35 according to the discrimination result by the discriminator 34. Then, the image data are compressed by a compressor 36 and stored in a code memory 37. The image data stored in the code memory 37 is expanded by an expander 38 and stored again in the image memory 31. In 4-in-1 mode, the image memory 31 stores image data of four documents as print data of one page. Then, the print data stored in the image memory 31 are sent to the print unit 40 to drive the optical system in order to form an image on the photoconductor drum 22.

The code memory 37 is managed by a memory management table stored in a random access memory 33. Another discriminator 32 discriminates the sentence direction (vertical and horizontal) based on the image data and sends the result to the memory management table.

Table 1 shows an example of management table. The management table is divided in memory areas of 00, 01, 02, 03 and the like. It further stores page number, front connection number, rear connection point, length, attribute and size for each memory area. The attribute of color, monochrome and the like is decided in a prescan in the automatic color selection. The code memory 37 can be managed by the information in the management table. In the example shown in Table 1, image data of four documents of one color document and three monochromatic documents are stored in areas 00 to 03.

The image reduction of four documents in 4-in-1 mode is explained according to automatic color selection. The automatic color selection is explained with reference to FIGS. 6–8. In the automatic color selection, it is decided for each of documents based on information on color whether the document is a color document or a monochromatic document. The information on color is a ratio of color portions in image data of each document. In the example explained below, the numbers of color dots and all dots are obtained, and the ratio

TABLE 1

Memory management table

| Area | Page | Front connection | Rear connection | Length | Attribute | Size |
|------|------|------------------|-----------------|--------|-----------|------|
| 00 | 1 | 00 | 01 | | Color | |
| 01 | 1 | 01 | 02 | | Mono | |
| 02 | 1 | 01 | 03 | | Mono | |
| 03 | 1 | 03 | FF | | Mono | |
| .. | .. | .. | .. | | .. | |
| .. | .. | .. | .. | | .. | | of color portions is obtained as a ratio of the color dots to all the dots.

Figure 6:
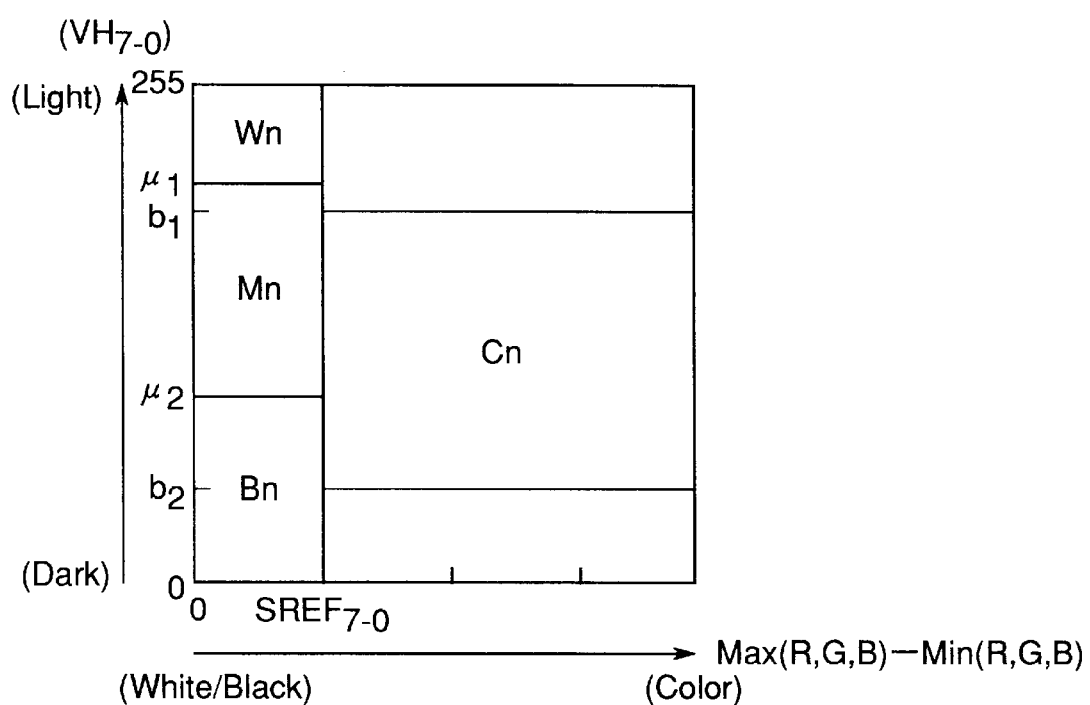
FIG. 6 is a diagram for explaining decision of a color document and a monochromatic document.

In order to select color copy mode and monochromatic copy mode, the central processing unit 103 obtains frequencies as shown in FIG. 6. The image data R, G and B are converted to value data (lightness) $VH_{7-0}$, and the value data is input as an address in first and second histogram memories (not shown) which represent gradation level as address and frequency at the gradation level as data at the address. The data in the first and second histogram memories have been initialized to "0000" for the addresses before a prescan. When an address is input, the data at the address is incremented by one and rewritten at the same address. Thus, the histogram memories are operated in a read-modify-write cycle as one cycle of eight bits. The first histogram memory produces a histogram h1 (n) of value data simply. On the other hand, the second histogram memory produces a histogram h(2) on achromatic dots in a document. When a difference between the maximum MAX and minimum MIN of R, G and B data on a dot is not smaller than a threshold level SREF, the dot is decided to be an achromatic dot, and the second histogram memory is forbidden to be accessed. In the operation of the frequency memories, the image data are thinned out appropriately in order to decrease capacities of the histogram memories. The histograms are operated only in a document area determined in a prescan.

When a prescan is completed, the central processing unit 103 reads a frequency of each gradation level from the frequency memories. Further, it generates a third histogram h(3) as follows:

$$h3(n) = h1(n) - h2(n),$$

where n is an address. Further, Bn and Cn are calculated as follows:

$$Bn = \sum_{n=0}^{\mu 2} h1(n),$$

and $$Cn = \sum_{n=b2}^{b1} h3(n),$$

where $\mu 1$ is a boundary of black, and b1 and b2 are boundaries of value data of chromatic dots. Bn and Cn represent a sum of frequencies of black, and a sum of frequencies of chromatic dots of the document. Then, a ratio of chromatic dots Cn/(Cn +Bn) is calculated, and if the ratio is smaller than a reference value, it is decided that the document is a monochromatic document, otherwise it is decided that the document is a color document.

Figure 4:
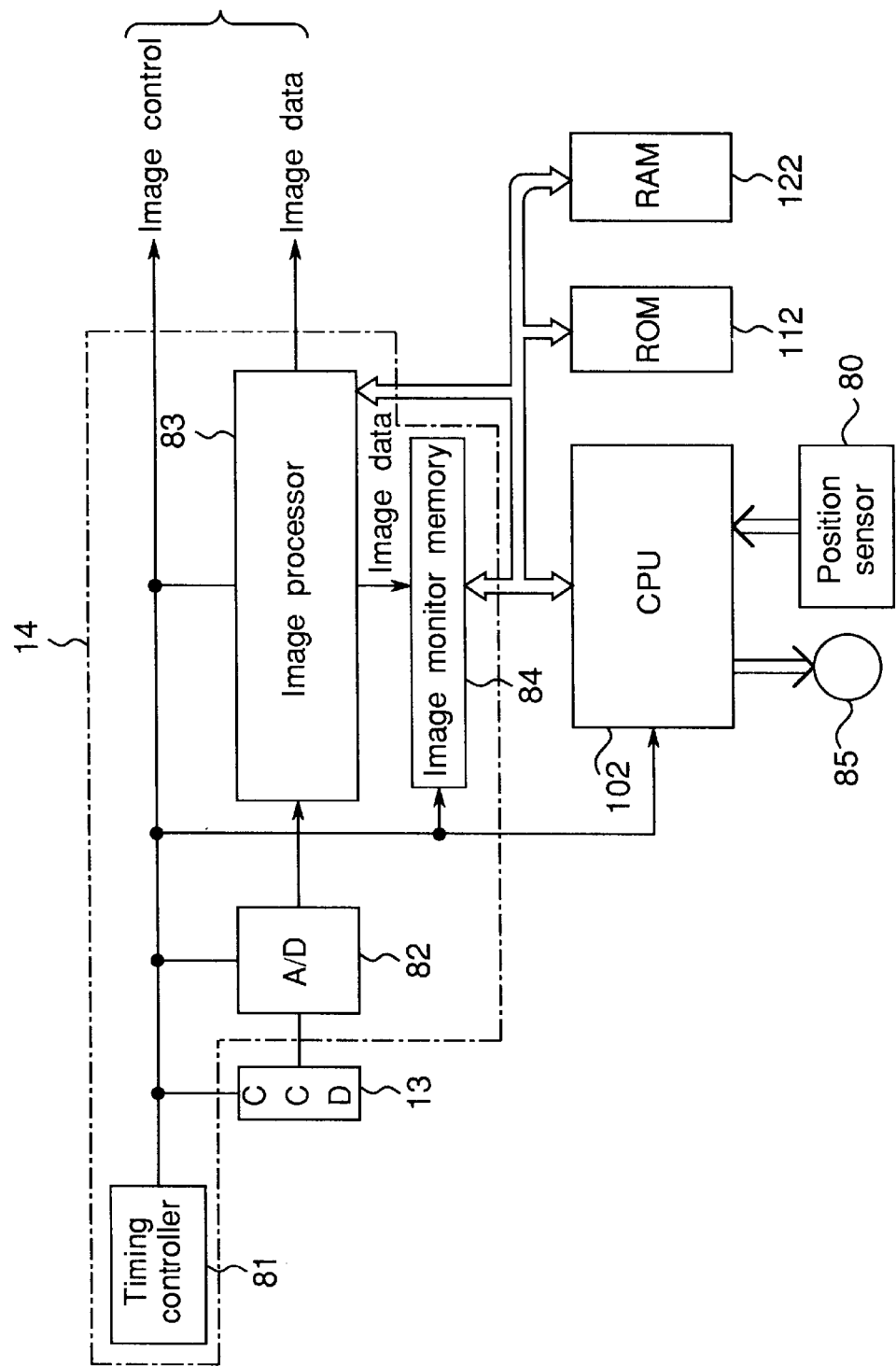
FIG. 4 is a block diagram of a controller for controlling document feed.
Figure 7:
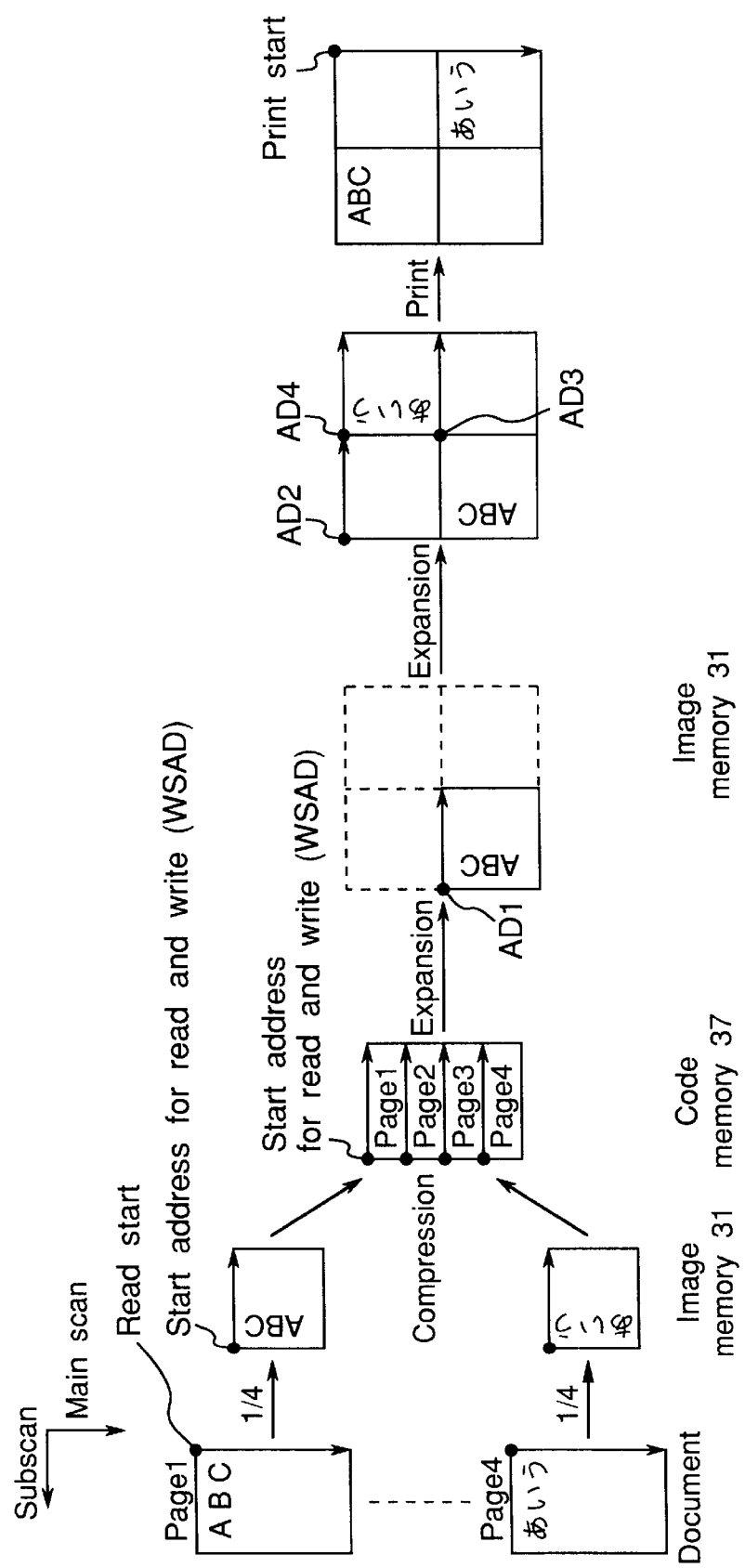
FIG. 7 is a diagram for illustrating image data processing in 4-in-1 mode.

Next, image processing in 4-in-1 mode is explained with reference to FIG. 7. In this mode, each of four documents (pages 1–4) is read with the color image sensor 13 at ¼ of magnification by the image reader 10, and the data are sent through the image data processing unit 14, shown in FIG. 4, to the memory unit 17 to be written to the image memory 31 therein shown in FIG. 5. Then, the image data in the image memory 31 is compressed to be written in the code memory 37. Thus, code data of the four pages are written to the code memory 37. Then, the code data of the four pages are expanded successively to be written to the image memory 31. Thus, one page of print data are written in the image memory 31. Then, the print data are sent to the print unit 40.

FIG. 8 explains a relation of the color change number (reference value) in 4-in-1 mode to the documents of four pages. As shown in the output patterns in FIG. 8, there are five cases where the four documents include zero, one, two, three and four color documents. If the color change number is set to four, color copy mode is selected only when all the four documents are color documents. On the other hand, if the color change number is set to one, color copy mode is selected when at least one color document is included in the four documents. In general, in N-in-1 mode (N is a natural number) where documents of N pages is printed in a sheet of paper, the color change number means the least number of color documents in the N pages for selecting color copy mode.

In this embodiment, the color change number is set to either of "1" and "4" . However, generally, it can be in various ways. For example, in 4-in-1 mode, if the color change number is set to "2", a color print is produced if the number of color documents is two or more, and if the color change number is set to "3", a color print is produced if the number of color documents is three or more.

Next, the control of 4-in-1 mode is explained with reference to flowcharts shown in FIGS. 9–15. In these flows, "on-edge" denotes a change from "off"-state to "on" state in status of key, switch, sensor, signal or the like.

Figure 9:
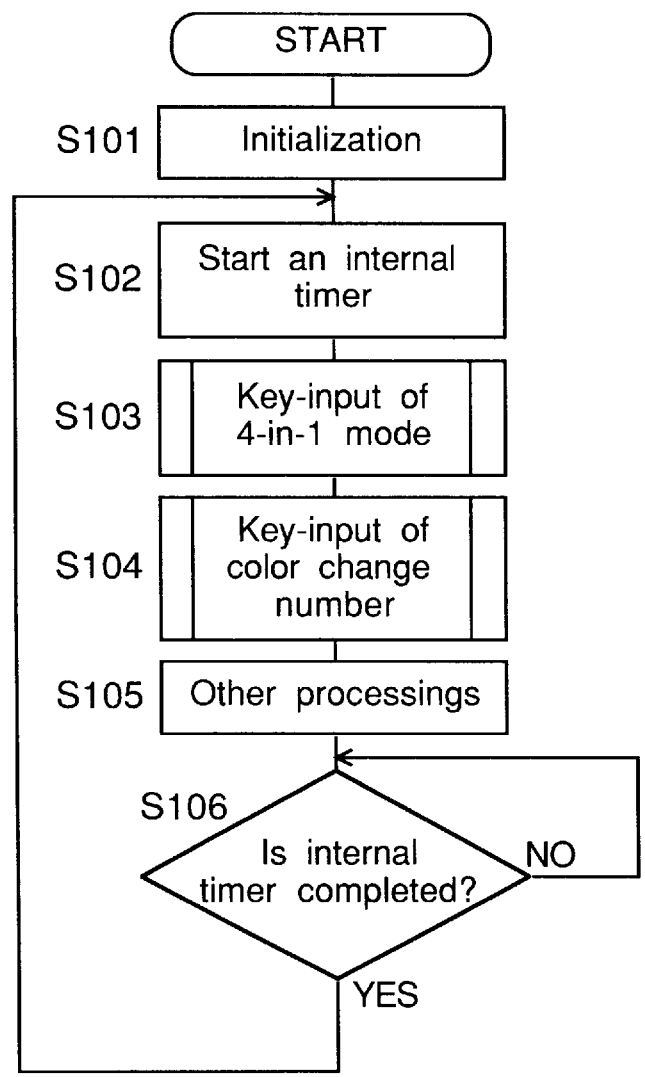
FIG. 9 is a flowchart of a central processing unit 101.

FIG. 9 shows a main flow of the central processing unit 101 for controlling the operational panel 16. After the random access memory 121 is initialized (step S101), an internal timer is started (step S102). Then, key-inputs of 4-in-1 mode (step S103, FIG. 10) and color change number (step S104, FIG. 11) are processed. Then, other key inputs and the display are processed (step S105). Next, after the internal timer is completed (YES at step S106), the flow returns to step S102.

Figure 10:
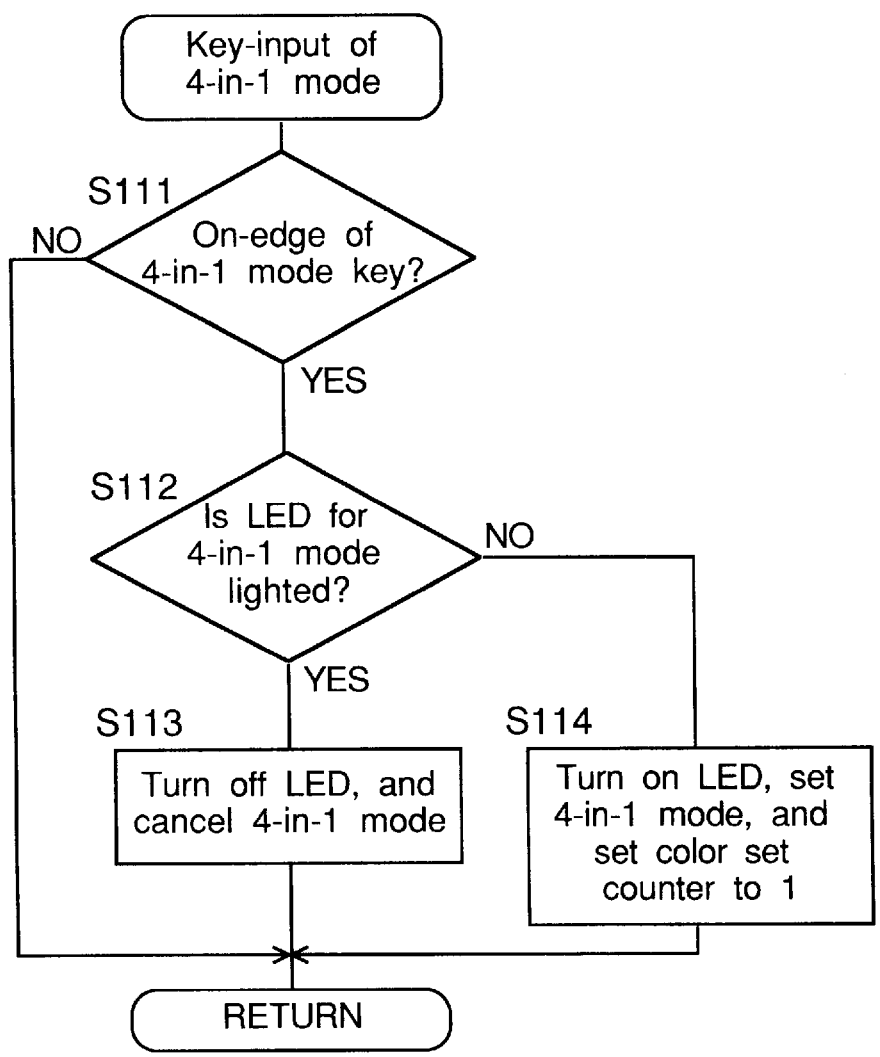
FIG. 10 is a flowchart of key-input of 4-in-1 mode key.

FIG. 10 shows a flow of the key-input of 4-in-1 mode (step S103 in FIG. 9) for setting 4-in-1 mode. First, it is decided whether an on-edge of the 4-in-1 mode key 166 is detected or not (step S111). If the on-edge is not detected (NO at step S111), the flow returns readily to the main flow. On the other hand, if the on-edge is detected (YES at step S111), it is decided next whether the light emitting diode 168 for 4-in-1 mode is lighted or not (step S112). If it is decided that the light emitting diode 168 is lighted (YES at step S112), the light emitting diode 168 is turned off and 4-in-1 mode is canceled (step S113). On the other hand, if it is decided that the light emitting diode 168 is not lighted (NO at step S112), the light emitting diode 168 is turned on, 4-in-1 mode is selected, and the color set counter is set to "1" (step S114).

Figure 11:
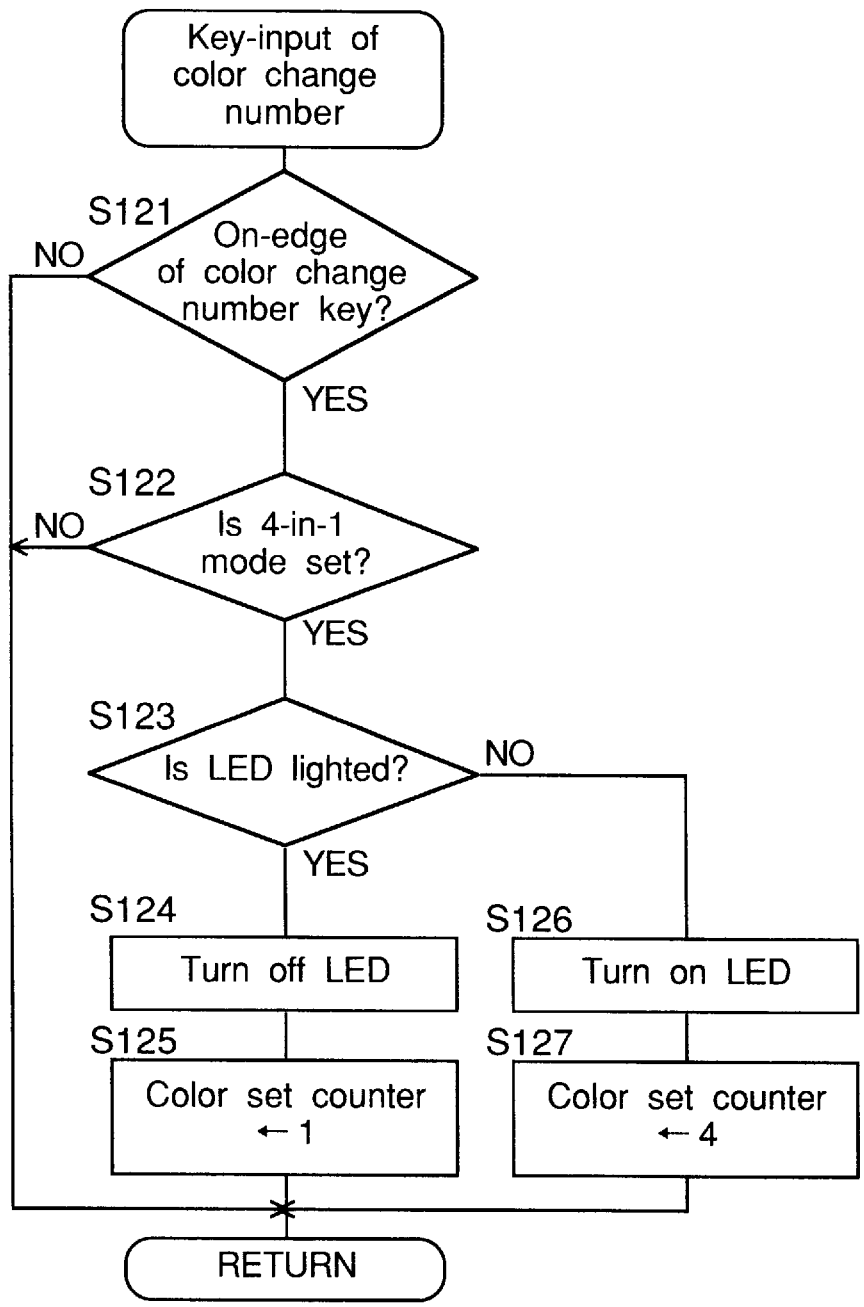
FIG. 11 is a flowchart of key-input of color change key.

FIG. 11 shows a flow of the key-input of color change number (step S104 in FIG. 9) for changing the value set in the color set counter. First, if it is decided that an on-edge of the 4-in-1 mode key 167 is detected (YES at step S121), and if it is decided that 4-in-1 mode is set (YES at step S122), the flow proceeds to step S123. Otherwise the flow returns readily to the main flow. At step S123, it is decided whether the light emitting diode 169 for 4-in-1 mode is lighted or not. If it is decided that the light emitting diode 169 is lighted (YES at step S123), the light emitting diode 169 is turned off (step S124), and the color set counter is set to "1" (step S125). On the other hand, if it is decided that the light emitting diode 169 is not lighted (NO at step S123), the light emitting diode 169 is turned on (step S126), and the color set counter is set to "4" (step S127).

Figure 12:
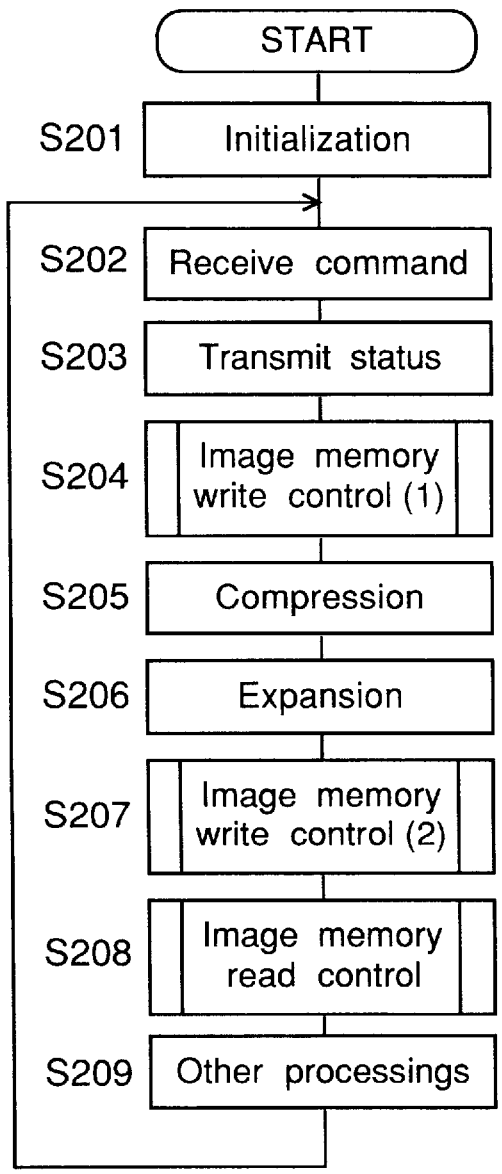
FIG. 12 is a flowchart of a central processing unit 103.

FIG. 12 shows a flow of the central processing unit 103 for controlling the memory unit 17. After the random access memory 123 is initialized (step S201), a command is received from the central processing units 101, 102, 104–106 (step S202), and statuses are sent and received to and from them (step S203). Next, the image data received from the image data processing unit 14 is written to the image memory 31 (step S204, FIGS. 13A and 13B), and the image data is compressed to be written to the code memory 37 (step S205). Then, the code data in the code memory 37 are expanded (step S206) and the image data of four pages are written to the image memory 31 as print data of one page (step S207, FIGS. 14A and 14B). Next, the print data are read from the image memory 31 to be sent to the print head controller 18 (step S208, FIG. 15). After other processings are performed (step S209), the flow returns to step S202.

Figure 13A:
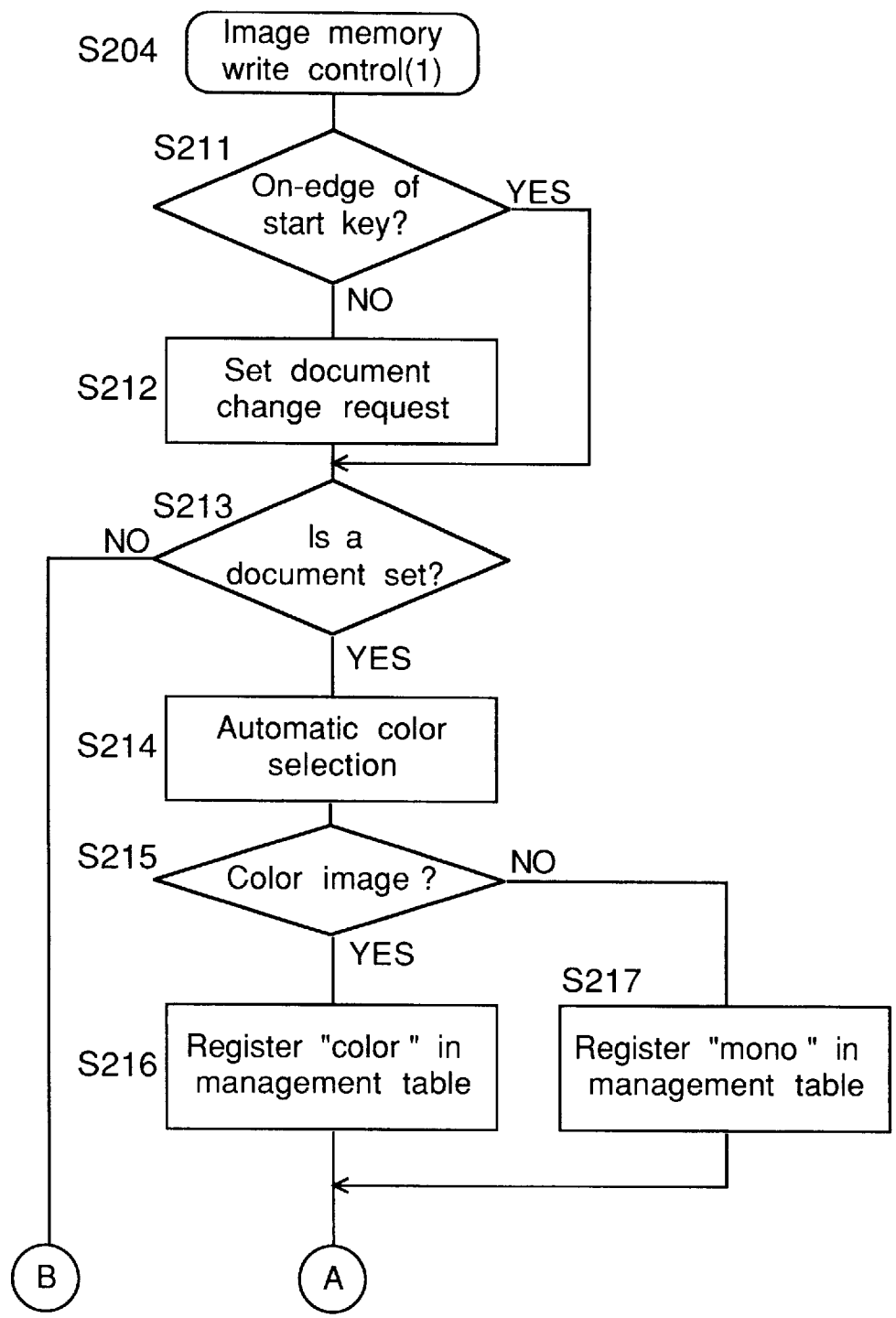
FIGS. 13A and 13B are flowcharts of image memory write control (1)
Figure 13B:
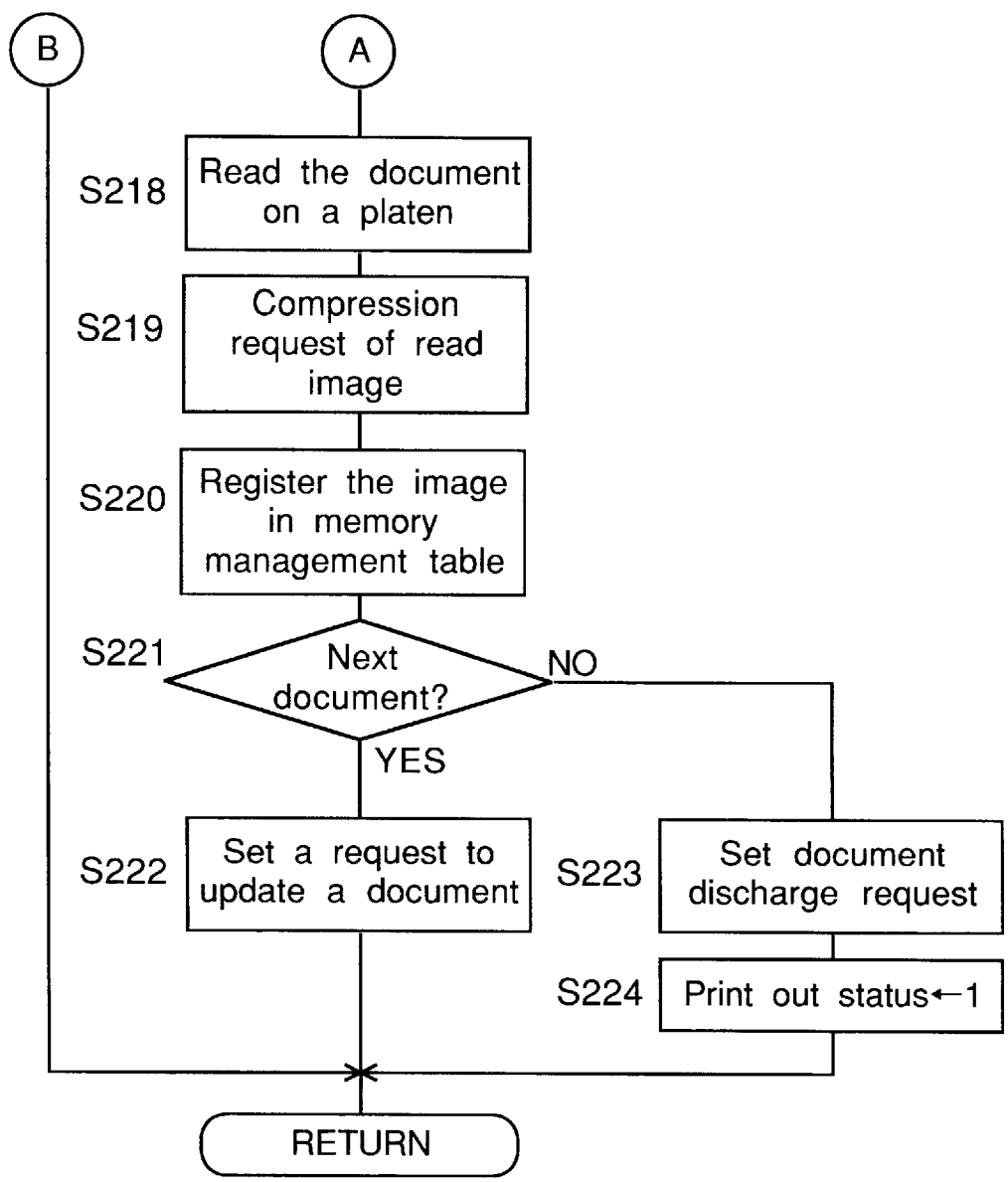

FIGS. 13A and 13B show a flow of the image memory write control (1) (step S204 in FIG. 12). First, when an on-edge of the start key 165 is not detected (NO at step S211), a document change request is set (step S212). Next, when a document is not detected to be set on the platen glass (NO at step S213), the flow returns readily to the main flow. On the other hand, when a document is detected to be set on the platen glass (YES at step S213), the automatic color selection is performed to determine whether the document is a color document or not (step S214). If the document is decided to be a color document (YES at step S215), the attribute of color is registered in the memory management table (step S216). Otherwise the attribute of monochrome is registered in the memory management table (step S217).

Next, an image of the document is read (step S218), compression of the read image is requested (step S219), and the read image is registered in the memory management table (step S220).

Then, it is decided whether there is a next document or not (step S221). If it is decided that there is a next document (YES at step S221), a request to set a next document is sent (step S222). On the other hand, if it is decided that there is no next document (NO at step S221), a request to set discharge the document is sent (step S223), and the status counter of print out is set to "1" (step S224). Then, the flow returns to the main flow.

When this flow of the image memory write control (1) is repeated four times for four documents to be reproduced on a sheet of paper. In each cycle, one of the documents is read in a prescan for automatic color selection (step S214), and the document is read again (step S218) to be compressed and stored in the code memory 37.

Figure 14A:
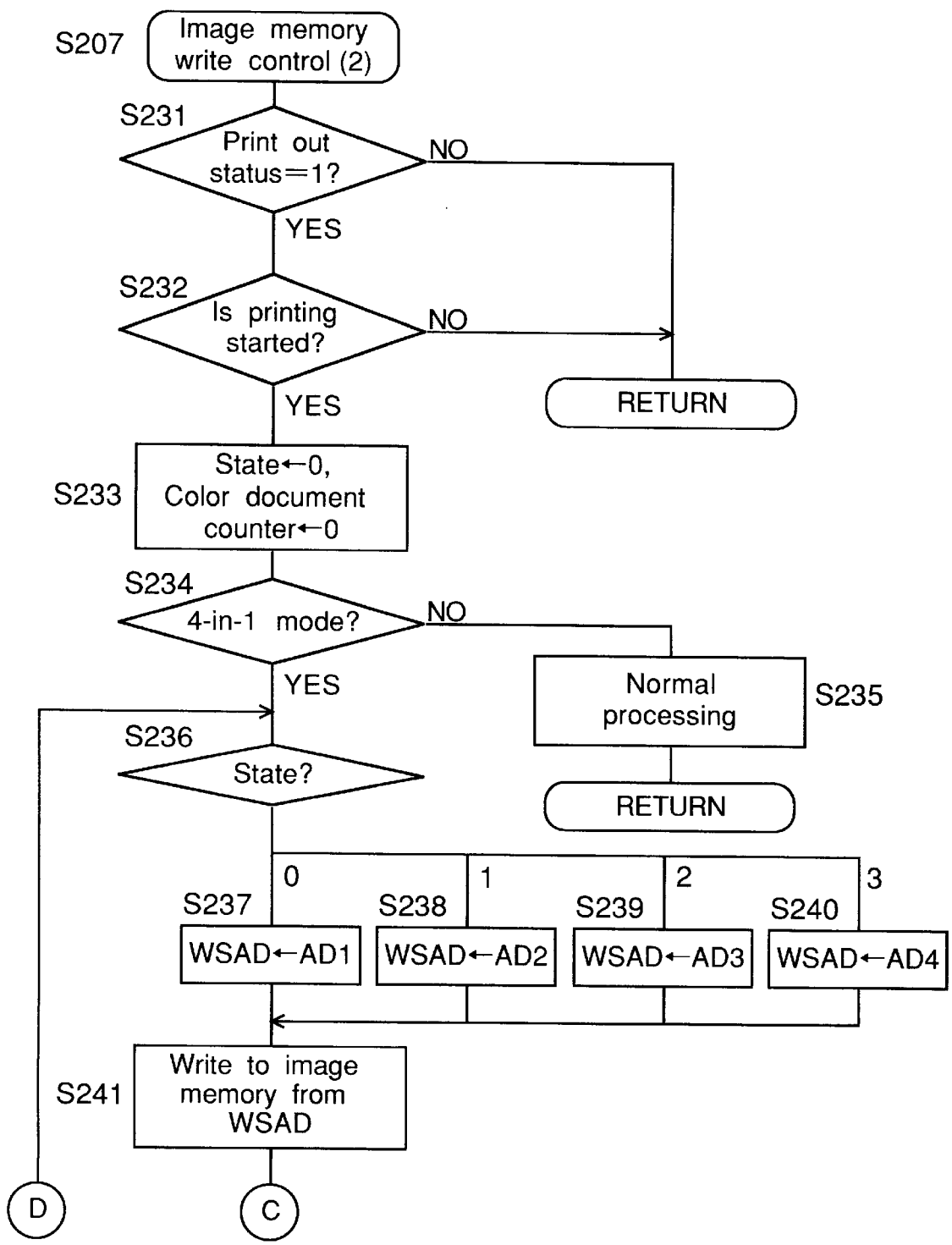
FIGS. 14A and 14B are flowcharts of image memory write control (2)
Figure 14B:
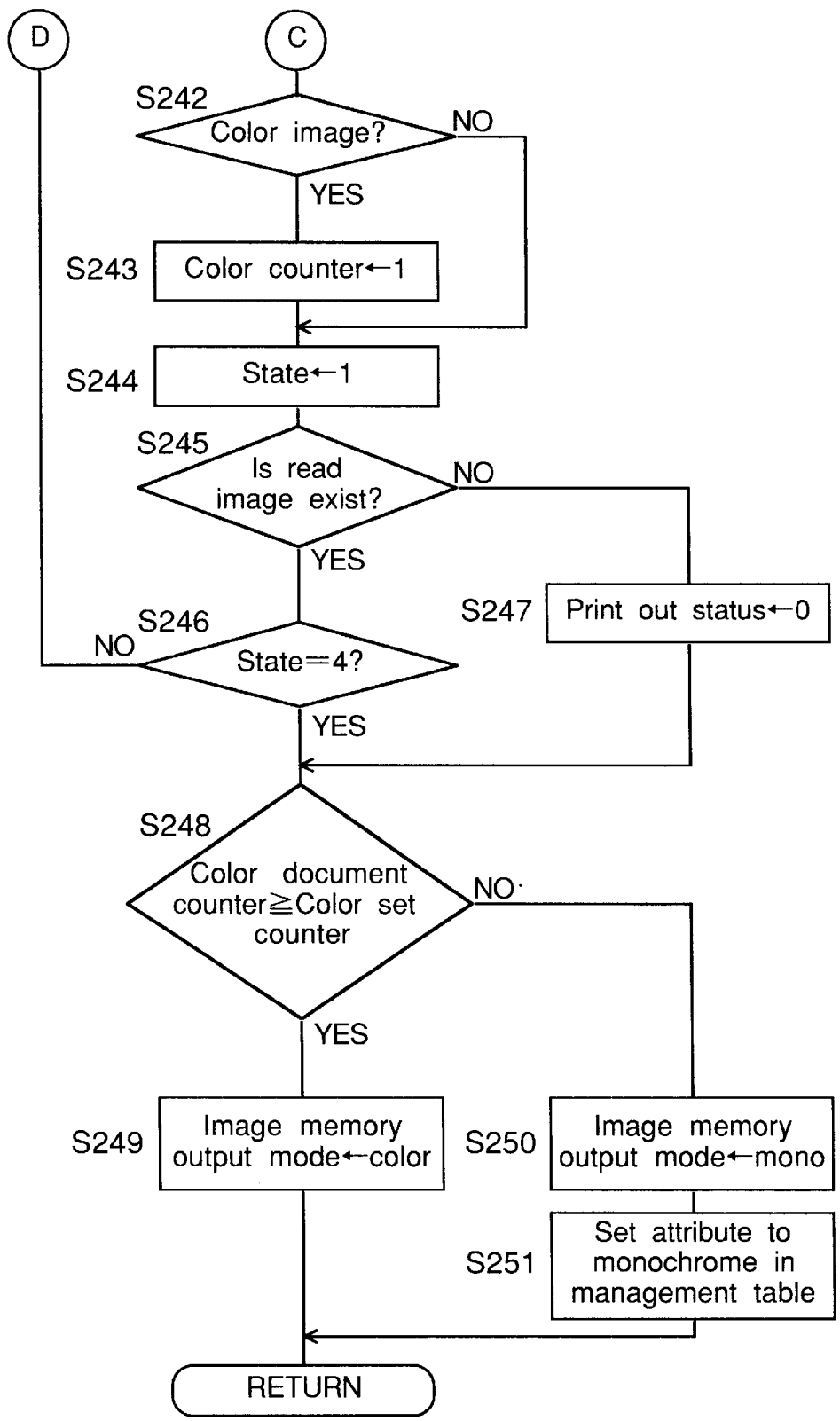

FIGS. 14A and 14B show a flow of the image memory write control (2) (step S207 in FIG. 12). If the print out status is not "1" (NO at step S231) and if printing operation is not performed (NO at step 232), the flow returns readily to the main flow. Otherwise, the status counter is set to "0", and the color document counter is set to "0" (step S233).

Next, it is decided whether 4-in-1 mode is set or not (step S234). If it is decided that 4-in-1 mode is not set (NO at step S234), normal processing is performed (step S235), and the flow returns to the main flow.

If it is decided that 4-in-1 mode is set (YES at step S234), the flow branches according to the status in the status counter (step S236), and an address WSAD at which write to the image memory 31 is started is set at AD1, AD2, AD3 or Ad4 (refer to FIG. 7) according as the status is "0", "1", "2" or "3" (steps S237–S240). Then, the image data are written to the image memory 31 from the address WSAD (step S241).

Next, if the attribute of the read data is color (YES at step S242), the color document counter is incremented by one (step S243).

Then, the state in the status counter is incremented by one (step S244).

Then, if it is decided that there is a read image to be processed (YES at step S245) and if it is not decided that the state is four (NO at step S246), the flow returns to step S236 to process the read image.

On the other hand, if it is decided that there is a read image to be processed (YES at step S245) but if it is not decided that the state is four (YES at step S246), four pages have been processed, and the flow proceeds to step S248. If it is decided that there is no read image to be processed (NO at step S245), print out status is set to "0"(step S245), and the flow proceeds to step S248.

Next, the color document counter is compared with the color set counter (step S248). If it is decided that the color document counter is equal to or larger than the color set counter (YES step S248), the image memory output mode is set to color to print a color 4-in-1 image (step S249). On the other hand, if it is decided that the color document counter is smaller than the color set counter (NO step S248), the image memory output mode is set to monochrome to print a monochrome 4-in-1 image (step S250), and the attribute in the management table is changed to monochrome (step S251).

Figure 15:
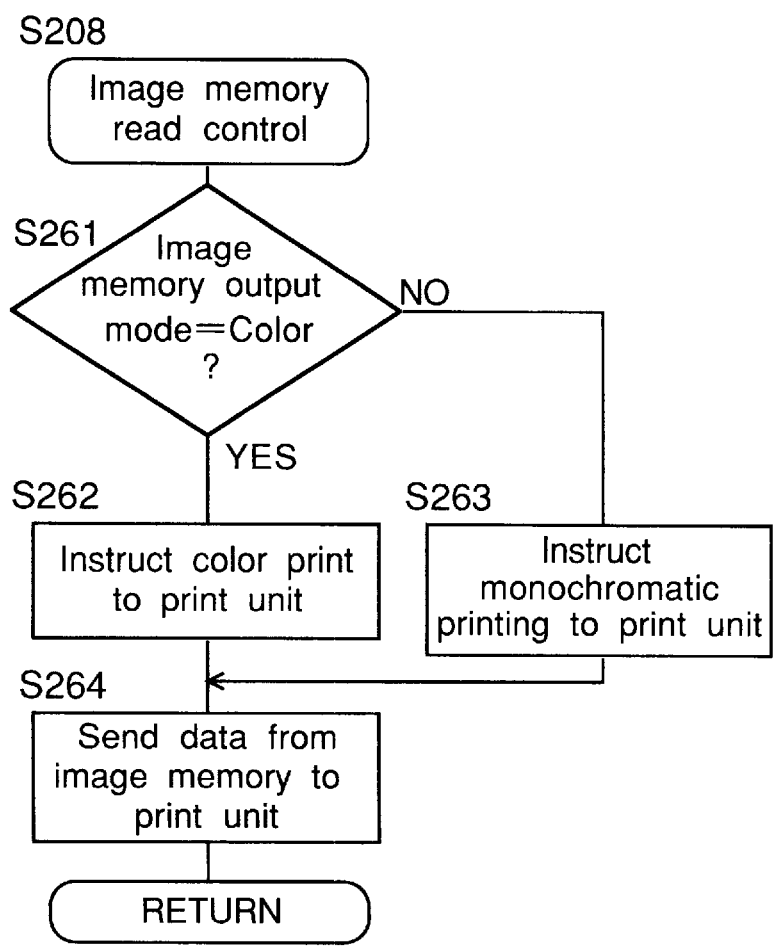
FIG. 15 is a flowchart of image memory read control.

FIG. 15 shows a flow of image memory read control (step S208 in FIG. 12). First, it is decided if the output mode of the image memory 31 is color or not (step S261). If it is decided that the output mode of the image memory 31 is color (YES at step S261), color print is instructed to the print unit 20 (step S262). On the other hand, if it is decided that the output mode of the image memory 31 is not color (NO at step S261), monochromatic print is instructed to the print unit 20 (step S263). Then, data are transferred from the image memory 31 to the print unit 20 according to the output mode (step S264).

Although the present invention has been fully described in connection with the preferred embodiments thereof with reference to the accompanying drawings, it is to be noted that various changes and modifications are apparent to those skilled in the art. For example, in the above-mentioned embodiment, color copy mode or monochromatic copy mode is selected according to a ratio of color documents when a plurality of documents is printed in a sheet of paper.

Similarly, when a plurality of documents is printed in normal copy mode, color copy mode or monochromatic copy mode may be selected according to a ratio of color documents. The reference value for selecting color copy mode or monochromatic copy mode can be changed. For example, a user can set the reference value for selecting color copy mode at 25%, 50%, 75% or the like according the situation of copying. If the reference value is set 25%, color copy mode is selected when a ratio of color documents is 25% or more.

In the above-mentioned embodiment, automatic color selection for determining color copy or monochromatic copy is performed in a prescan. Alternatively, the automatic color selection is performed in parallel in a scan for reading a document.

In the above-mentioned embodiment, information on color on a plurality of documents to be reproduced in a sheet of paper is obtained for each document read by said image reader. That is, each document is decided to be a color document or not. However, the selection may also be performed by obtaining histograms for the whole image data of the four documents. In this case, color copy mode is selected, for example, when the ratio $Cn/(Cn+Bn)$ on the four documents is larger than a reference value.

Such changes and modifications including the above-mentioned examples are to be understood as included within the scope of the present invention as defined by the appended claims unless they depart therefrom.

What is claimed is:

1. An image forming apparatus having a mode for forming an image of a plurality of documents in a sheet of paper, the apparatus comprising:

an image reader for reading an image of a document for forming a color image or a monochromatic image on a sheet of paper;

a detection device for obtaining information on color on a plurality of documents to be reproduced in a sheet of paper from image data of the plurality of documents read by said image reader; and a controller for controlling color conditions on image formation for an image of the plurality of documents to be reproduced in a sheet of paper according to the information on color obtained by said detection device.

2. The apparatus according to claim 1, wherein said detection device obtains information on color for each of the plurality of documents whether the document is a color document or a monochromatic document.

3. The apparatus according to claim 2, wherein the information on color is a ratio of color portions in image data.

4. The apparatus according to claim 1, wherein said controller controls a print device to form a color image when a ratio of color documents in the plurality of documents is larger than a predetermined value.

5. The apparatus according to claim 1, wherein said controller controls a print device to form a color image or a monochromatic image of the plurality of documents to be reproduced in a sheet of paper according to the information on color obtained by said detection device.

6. The apparatus according to claim 1, wherein the detection device detects the information on color in a prescan performed before a scan for forming an image by a print device.

7. The apparatus according to claim 1, wherein said detection device obtains information on color for all the plurality of documents.

8. An image forming apparatus having a mode for forming an image of a plurality of documents in a sheet of paper, the apparatus comprising:

an image reader for reading an image of a document for forming a color image or a monochromatic image on a sheet of paper;

a detection device for obtaining information on color on a plurality of documents to be reproduced in a sheet of paper from image data of the plurality of documents read by said image reader; and a controller for controlling color conditions on image formation for an image of the plurality of documents to be reproduced in a sheet of paper according to the information on color obtained by said detection device.

wherein said detection device detects that the document is a color document if a ratio of color portions in image data of the document read by said image reader is larger than a reference value.

9. The apparatus according to claim 8, further comprising an instruction device which changes the reference value.

10. An image forming apparatus, the apparatus comprising:

an image reader for reading an image of a document;

a print device for forming a color image or a monochromatic image on a sheet of paper;

a detection device for obtaining information on a ratio of color portions in image data of a plurality of documents read by said image reader; and a controller for controlling said print device to change image-forming conditions thereof for an image of the plurality of documents to be reproduced in a sheet of paper according to a result of the information obtained by said detection device.

11. The apparatus according to claim 10, wherein the detection device detects the information on color in a prescan performed before a scan for forming an image by said print device.

12. The apparatus according to claim 10, wherein said controller controls image formation by comparing the ratio of color portions in image data with a predetermined reference value.

13. The apparatus according to claim 12, further comprising a new device for setting the predetermined reference value.

* * * * *